United States Patent [19]
Levan

[11] Patent Number: 4,597,424
[45] Date of Patent: Jul. 1, 1986

[54] CARVING ADAPTER FOR MULTI-PURPOSE WOODWORKING MACHINE

[76] Inventor: Robert L. Levan, Rte. 2, Box 87, Hiddenite, N.C. 28636

[21] Appl. No.: 718,809

[22] Filed: Apr. 2, 1985

[51] Int. Cl.⁴ .............................................. B27C 5/00
[52] U.S. Cl. ..................... 144/1 C; 83/574; 144/1 R; 144/136 R; 409/181; 464/92
[58] Field of Search .......... 409/181; 83/574; 144/1 R, 3 R, 134 R, 136 R, 1 C; 74/16; 29/33 J; 464/92

[56] References Cited
U.S. PATENT DOCUMENTS

| | | |
|---|---|---|
| 112,860 | 3/1971 | Soley . |
| 1,122,422 | 12/1914 | Tuma . |
| 1,146,730 | 7/1915 | Osgood et al. . |
| 1,644,432 | 10/1927 | Howland . |
| 1,802,800 | 4/1931 | Wilderson . |
| 2,517,608 | 8/1950 | Taylor ................... 144/1 C |
| 2,567,127 | 9/1951 | Shoffner . |
| 2,619,135 | 11/1952 | Callaway . |
| 2,623,269 | 12/1952 | Goldschmidt ............. 144/1 C |
| 2,768,663 | 10/1956 | Jones . |
| 3,823,663 | 11/1966 | Davis . |
| 4,221,147 | 9/1980 | Sumida . |

FOREIGN PATENT DOCUMENTS

| | | |
|---|---|---|
| 803585 | 4/1951 | Fed. Rep. of Germany . |
| 282063 | 7/1929 | United Kingdom . |

*Primary Examiner*—W. D. Bray
*Attorney, Agent, or Firm*—Bell, Seltzer, Park & Gibson

[57] ABSTRACT

The woodworking device is of the type having a base; a horizontally extending support frame carried by the base; and a drive motor mounted on the support frame for being adjustably moved to and maintained at selected positions along said horizontally extending support frame. The drivew motor has a rotatable drive shaft extending generally horizontally. The machine has an accessory seat carried by the base for receiving thereon various woodworking tools or accessories. The carving adapter comprises a mounting platform for being carried by the accessory seat; bearing means carried by said mounting platform; an elongate rotatable shaft having a first portion extending from one end thereof to a medial location in the shaft and a second portion extending from the medial location to the other end thereof. The first portion of the elongate shaft is rotatably received by the bearing means, and the second portion of the shaft projects outwardly beyond the mounting platform and beyond the base of the multi-purpose woodworking machine so as to provide a wide clearance for manipulating wooden objects during carving thereof. The adapter includes means for interconnecting the one end of the rotatable elongate shaft with the drive shaft of the motor for thereby rotating the shaft upon operation of the motor; and mounting means provided at the other end portion of the rotatable shaft for receiving thereon a cutting tool so that upon operation of the motor the cutting tool is rotated for carving wooden objects which are brought into engagement with the carving tool.

11 Claims, 3 Drawing Figures

CARVING ADAPTER FOR MULTI-PURPOSE WOODWORKING MACHINE

FIELD OF THE INVENTION

The present invention relates to woodworking tools and particularly to accessories which can be used in combination with multi-purpose woodworking machines.

BACKGROUND OF THE INVENTION

Many types of power driven tools are known and used in the woodworking arts. Most power driven woodworking tools have both industrial and home or hobbyist level variations such that much of the woodworking which can be done quickly, repetitively and accurately on an industrial scale can also be accomplished accurately and conveniently with various home shop tools such as power saws, electric drills, drill presses, lathes, planars, sanders and the like.

Many such tools have been available as individual units for home use for some time. Additionally, over the past several decades there has arisen in the industry several versions of multi-purpose woodworking machines particularly designed and adapted for use in a home, in a hobby situation or in smaller professional applications. These multi-purpose woodworking machines are generally adaptable to perform at least five basic functions: sanding, sawing, turning, boring and drilling. Additionally, with various accessories which can be added to one or more of the five basic functions, the multi-purpose woodworking machine can perform a much larger number of woodworking tasks.

By way of background and not as limitation, two of the most common devices are sold under the trademarks SHOPSMITH and WOODMASTER MULTI-TOOL, although other manufacturers produce very similar machines under other tradenames. Because of the growth in popularity of such machines, the accessories for one particular brand machine are generally interchangeable with those of any other particular brand of machine and the various trade named multi-purpose woodworking machines tend to closely resemble one another. Consequently, an accessory which will be useful with one particular brand of multi-purpose woodworking machine will very likely be identically useful with most or all of the other brands of multi-purpose woodworking machines currently on the market.

One particular type of woodworking tool which has wide application especially for skilled craftsmen and yet which has not been available as an accessory for home multi-purpose woodworking machines is the carving spindle. Generally speaking, a carving spindle is a professional woodworking tool of straightforward design which can produce an infinite variety of detailed woodworking results. A professional carving spindle usually includes an electric motor which drives a belt, which in turn rotates a shaft at very high rates of rotation. The motor and shaft are mounted such that they would be approximately waist-high to a person using the carving spindle. The rotating shaft is mounted horizontally and has a woodworking end which projects outwardly away from the motor and belt such that pieces of wood to be worked by the spindle can be moved freely in almost any conceivable direction around the far end of the shaft without interfering with the motor and drive belt and vice versa.

The woodworking end of the shaft usually carries a small cutting blade which performs the actual carving when the shaft is rotating. Thus, with the cutting tool positioned relatively independently from the rest of the machine, items to be carved can be moved in a variety of directions within an imaginary sphere which almost completely surrounds the woodworking end of the shaft. Because of the freedom of movement of a piece of wood which the design of a carving spindle provides, a piece of wood to be worked can be moved around and contacted with the cutting tool in a variety of directions to produce an infinite variety of carving possibilities.

As previously mentioned herein, presently no adapters exist which can be used on the described multi-purpose woodworking machines which allow those machines to be used as carving spindles in home, hobby or small professional applications.

It is thus an object of the present invention to provide an adapter for a multi-purpose woodworking machine which will convert the multi-purpose woodworking machine into a carving spindle for making individual and detailed carvings in wooden objects.

SUMMARY OF THE INVENTION

The present invention provides a carving adapter for making individual and detailed carvings especially in wooden objects and the like and which is adapted for being used in combination with a multi-purpose woodworking machine of the type which is adapted for being converted into various woodworking devices such as a circular saw, a lathe, a drill press, a disk sander or the like. The adapter comprises a mounting platform for being carried by the multi-purpose woodworking machine, bearings carried on the mounting platform, an elongate rotatable shaft having a first portion carried by the bearings and a second portion extending outwardly beyond the mounting platform of the adapter and beyond the base of the multi-purpose woodworking machine, a coupling for interconnecting one end of the elongate shaft with the drive shaft of the motor of the multi-purpose woodworking machine and a mounting means at the far end portion of the rotatable shaft for receiving thereon a cutting tool so that upon operation of the motor the cutting tool is rotated for carving wooden objects which are brought into engagement with the carving tool.

DESCRIPTION OF THE DRAWING

The foregoing and other objects, advantages and features of the inventions, and the manner in which the same are accomplished will become more readily apparent upon consideration of the following detailed description of the invention taken in conjunction with the accompanying drawings which illustrate preferred and exemplary embodiments and wherein.

DETAILED DESCRIPTION OF THE INVENTION

Figure 1:
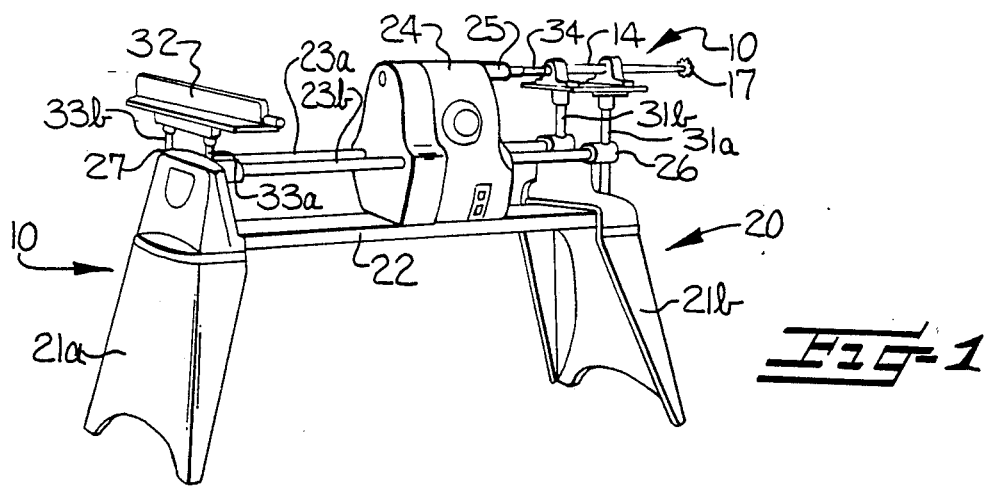
FIG. 1 is a perspective view of the carving adapter of the present invention as it is carried upon and interconnected with a multi-purpose woodworking machine.

Turning to the invention in more detail, FIG. 1 illustrates a multi-purpose woodworking machine broadly designated at 20 which carries the carving adapter of the present invention broadly designated at 10. The multi-purpose woodworking machine 20 has a base, which in the embodiment shown is made up of a pair of spaced apart upright footings 21a and 21b opposite from one another at either end of the machine and a horizontally positioned base member 22 positioned between and partially supporting the footings 21a and 21b. A horizontally extending support frame is carried by the base and in the embodiment shown in FIG. 1 comprises a pair of spaced apart horizontally extending tubular frame members 23a and 23b. A drive motor 24 is mounted on the support frame members 23a and 23b and is typically located within a housing as illustrated in FIG. 1. The motor 24 and the tubular frame members 23a, 23b are structured such that the motor may be adjustably moved along the tubular frame members 23a and 23b to, and then maintained at, selected positions along the horizontal tubular frame members 23a, 23b. The capability that the multi-purpose woodworking machine provides in allowing the motor to be moved to and then maintained at various positions is one of the features which makes the device suitable for a variety of woodworking tasks and adaptable to a variety of woodworking tools.

The drive motor 24 has a rotatable drive shaft 25 which extends generally horizontally from the motor parallel to the tubular frame members 23a and 23b and to the horizontal base member 22. The drive shaft 25 may be variably coupled to the numerous tools and adapters which may be used with the multi-purpose woodworking machine and powers the various tools and adapters.

One or more accessory seats are also carried by the base and by the horizontal support frame defined by the tubular frame members 23a and 23b. In the embodiment shown, two such accessory seats 26 and 27 are shown and are located at opposite ends of the tubular frame members 23a and 23b. Both accessory seats generally comprise generally cylindrical sockets into which various tools may be inserted and mounted. In the illustrated embodiment the carving adapter 10 is carried on a pair of upright members 31a and 31b which extend generally vertically from the accessory seat 26. Depending upon the particular type of machine and accessory seat, upright members such as those illustrated as 31a and 31b herein may comprise part of the accessory seat or part of the mounting platform of the carving adapter and the particular method of mounting the adapter is not to be considered as limiting the scope of the invention or of the claims. Also in the illustrated embodiment, a tool rest 32 is shown as resting upon a similar pair of upright members 33a and 33b extending from the accessory seat 27 at the opposite end of the multi-purpose woodworking machine 20.

As is known to those familiar with power woodworking tools and especially with the most common and popular multi-purpose woodworking machines, the several brands of machine generally provide the type of accessory seating illustrated in the drawings. It is to be understood, however, that the method of seating particular tools upon particular variations of multi-purpose woodworking machines is not a limitation of the present invention but is only included for purposes of illustration and while reflecting the most commonly envisioned use of the invention, does not in any way limit the manner in which the invention can be carried by a multi-purpose woodworking machine.

Additionally, it will be further understood by those familiar with multi-purpose woodworking machines, that the overall structure and design illustrated in FIG. 1 is a common and characteristic design, but is not limiting as to the type of machine upon which the present invention may be used.

Figure 2:
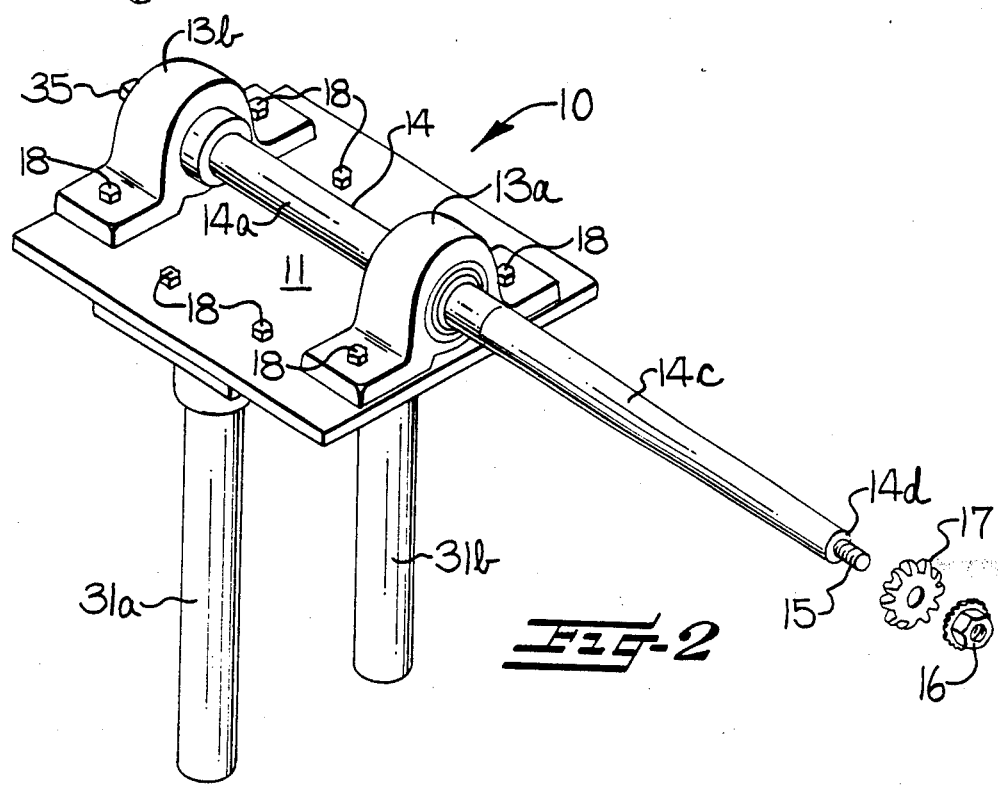
FIG. 2 is a perspective view of the carving adapter.

Turning in more detail to the carving adapter itself, FIG. 2 is a larger, perspective illustration of one preferred embodiment of the present invention. For purposes of orientation, the carving adapter is shown in FIG. 2 as being carried by the upright members 31a and 31b which, as described previously herein, will be positioned in the accessory seat 26 of the multi-purpose woodworking machine.

As illustrated in FIG. 2, the carving adapter comprises a mounting platform 11 which is carried by the accessory seat 26. Bearing means 12a and 12b are carried by the mounting platform 11 and in the illustrated embodiment are positioned upon the mounting platform in saddletype mounts 13a and 13b. An elongate rotatable shaft broadly designated at 14 is carried by the bearings. The shaft 14 has a first portion 14a which extends from a medial location in the shaft to one end 14b thereof. A second portion 14c extends from the medial location of the shaft 14 to the other end 14d thereof. The first portion 14a of the elongate shaft is rotatably received by the bearing means 12a and 12b. In order to function properly as a carving spindle having a great deal of free space for manipulating wooden objects around it, the second portion 14c of the shaft 14 projects outwardly beyond the mounting platform 11, as illustrated in FIG. 2 and also beyond the base of the multi-purpose woodworking machine 20, an arrangement best illustrated in FIG. 1. The outwardly projecting second portion 14c of the shaft provides a wide clearance for manipulating wooden objects around the carving spindle during carving thereof.

Figure 3:
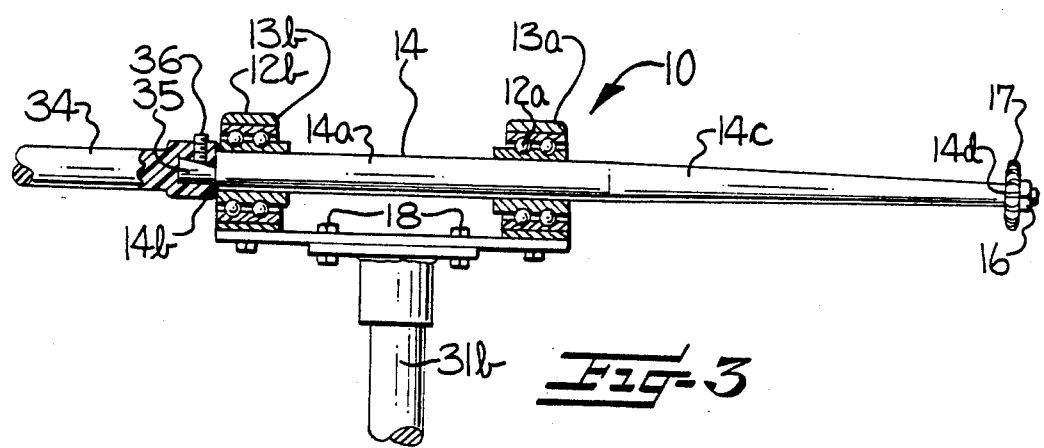
FIG. 3 is a side view of the carving adapter showing certain portions in cross section.

As best illustrated in FIG. 3, the carving adapter also includes means interconnecting the one end 14b of the rotatable shaft 14 with the drive shaft of the drive motor so that the shaft 14 thereby rotates upon operation of the motor. As further illustrated in FIG. 3, the means interconnecting the elongate shaft 14 with the drive shaft 25 of the motor comprises a flexible coupling 34 which can be coupled with one end 14b of the rotatable shaft 14. In the embodiment illustrated in FIG. 3, the flexible coupling 34 overlaps and is secured to a smaller cylindrical portion 35 of the shaft 14 and secured thereon by a set screw 36. It will be understood that the illustrated embodiment is only one of a number of ways in which the motor shaft and the elongate shaft may be connected to one another and is not intended to limit the scope of the present invention.

FIGS. 1 and 3 further illustrate that in one embodiment of the invention, the elongate shaft 14 of the carving adapter 10 is positioned coaxially with the drive shaft 25 of the motor 24.

At the other end 14d of the elongate shaft 14, there are provided mounting means for receiving thereon a cutting tool shown in FIG. 2 as the small, circular toothed blade 17. Upon operation of the motor the cutting tool 17 rotates for carving wooden objects which are brought into engagement therewith. As best illustrated in FIG. 2, the mounting means positioned on the end 14d of the elongate shaft 14 comprises a male threaded portion 15 and a corresponding nut 16 between which the cutting tool 17 may be positioned and then secured. The use of the threaded portion 15 and the corresponding nut 16 provides the means for various cutting tools to be easily interchanged upon the shaft 14 and yet which also allows these cutting tools to be firmly secured thereon. In other embodiments, the cutting tool 17 itself may be threaded for being mounted directly upon the threaded portion 15 of the shaft 14 with or without the further use of the nut 16.

In the illustrated embodiment of the invention, the mounting platform 11 is generally rectangular and is oriented substantially horizontally and parallel to the axis of rotation of the elongate shaft 14. The bearings 12a and 12b are positioned on opposite ends of the mounting platform 11 and are generally adjacent opposite ends of the first portion 14a of the elongate shaft 14 such that the first portion 14a is well supported and well balanced.

In order to further provide for balanced operation of the shaft and hence of the carving adapter as a whole, in one embodiment of the invention the first portion 14a and the second portion 14c of the shaft 14 are of substantially similar lengths. Furthermore, in order to enhance the independence during operation of the main portions of the carving adapter from interference with and obstruction of items being carved, the second portion 14c of the rotatable shaft 14 is tapered from the medial location to the other end 14d thereof. In the embodiment illustrated in FIG. 2, the first portion 14a of the elongate shaft 14 is shown as being of a generally cylindrical shape of fixed diameter along the entire length of the first portion 14a. It will be understood that while such a configuration is one preferable embodiment, the respective shapes of portions 14a and 14c of the elongate shaft 14 could be varied without departing from the spirit of the present invention or from the scope of the claims.

As shown in FIG. 3, the bearings 12a and 12b are illustrated a being ball bearings but it will be understood by those familiar with mounting rotating devices that several types of bearings could be used without departing from the scope of the invention.

In like manner, the seats for the bearings 13a and 13b are shown as saddle-type seats fastened to the mounting platform 11 by several of the bolts 18 which are used to fasten various portions of the carving adapter to one another and to the accessory seat of the multi-purpose woodworking machine. Nevertheless, it will be understood that various types of bearing mounts and various types of fastening devices could be used to assemble the respective portions of the carving adapter without departing from the scope of the invention or of the claims.

The foregoing embodiments are to be considered illustrative, rather than restrictive of the invention, and those modifications which come within the meaning and range of equivalence of the claims are to be included therein.

That which is claimed is:

1. In a multi-purpose woodworking machine of the type adapted for being converted into various woodworking devices such as a circular saw, lathe, drill press, disk sander, and the like, said device having a base; a horizontally extending support frame carried by said base; a drive motor mounted on said support frame for being adjustably moved to and maintained at selected positions along said horizontally extending support frame, said drive motor having a rotatable drive shaft extending generally horizontally; and an accessory seat carried by said base for receiving thereon various woodworking tools or accessories; the combination therewith of a carving adapter for converting the multi-purpose woodworking machine into a carving spindle for making individual and detailed carvings in wooden objects and the like; said carving adapter comprising:

a mounting platform carried by said accessory seat;
bearing means carried by said mounting platform;
an elongate rotatable shaft having a first portion extending from one end thereof to a medial location in said shaft and a second portion extending from said medial location to the other end thereof, said first portion of the elongate shaft being rotatably received by said bearing means, and said second portion of the shaft projecting outwardly beyond said mounting platform and beyond the base of the multi-purpose woodworking machine so as to provide a wide clearance for manipulating the wooden objects during carving thereof;
means interconnecting said one end of said rotatable shaft with the drive shaft of said motor for thereby rotating the shaft upon operation of the motor; and
mounting means provided at said other end portion of said rotatable shaft for receiving thereon a cutting tool so that upon operation of the motor the cutting tool is rotated for carving wooden objects which are brought into engagement with the carving tool.

2. A woodworking machine according to claim 1 wherein the upper surface of said second portion of the rotatable shaft is tapered from said medial location to said mounting means to reduce interference and obstruction during carving of the wooden object.

3. A woodworking machine according to claim 1 wherein the upper surface of said mounting platform of said carving adapter is oriented substantially horizontally and parallel to the axis of rotation of said elongate shaft.

4. A woodworking machine according to claim 1 wherein said first and second portions of said elongate shaft are of substantially similar lengths for providing balanced operation of said shaft and of said carving adapter.

5. A woodworking machine according to claim 1 wherein said mounting means positioned on said second end of said elongate shaft comprises a male threaded portion and a corresponding nut whereby a cutting tool may be threadingly received and secured upon said second end of said rotatable shaft.

6. A woodworking machine according to claim 1 wherein said bearing means comprises a pair of bearings spaced apart from one another adjacent respective opposite ends of said first portion of said elongate shaft for balancing and supporting said shaft at respective opposite ends of said first portion thereof.

7. A woodworking machine according to claim 1 wherein said elongate shaft of said carving adapter and the shaft of the drive motor are positioned coaxially with one another and wherein said means interconnecting said elongate shaft with the drive shaft of the motor comprises a flexible coupling.

8. In a multi-purpose woodworking machine of the type adapted for being converted into various woodworking devices such as a circular saw, lathe, drill press, disk sander, and the like, said device having a base; a horizontally extending support frame carried by said base; a drive motor mounted on said support frame for being adjustably moved to and maintained at selected positions along said horizontally extending support frame, said drive motor having a rotatable drive shaft extending generally horizontally; and an accessory seat carried by said base for receiving thereon various woodworking tools or accessories; the combination therewith of a carving adapter for converting the multi-purpose woodworking machine into a carving spindle for making individual and detailed carvings in wooden objects and the like; said carving adapter comprising:

a mounting platform carried by said accessory seat and having an upper surface oriented substantially horizontally and parallel to the axis of rotation of the motor drive shaft;

a pair of bearings carried by said mounting platform;

an elongate shaft having a first portion extending from one end thereof to a medial location in said shaft and a second portion extending from said medial location to the other end thereof, said first portion of the elongate shaft being rotatably received by said bearings, said second portion of said shaft projecting outwardly beyond said mounting platform and beyond the base of the multi-purpose woodworking machine so as to provide a wide clearance for manipulating the wooden objects during carving thereof, and said second portion of said shaft being tapered from said medial location to said other end to reduce interference and obstruction during carving of a wooden object;

said first and second portions of said shaft being of substantially similar lengths for providing balanced operation of said shaft;

a coupling interconnecting said one end of said elongate shaft with the motor drive shaft for thereby rotating said elongate shaft under operation of the motor; and a male threaded portion and a corresponding nut provided at said other end portion of said elongate shaft for receiving thereon a cutting tool so that upon operation of the motor the cutting tool is rotated for carving wooden objects which are brought into engagement with the carving tool.

9. In a multi-purpose woodworking machine of the type adapted for being converted into various woodworking devices such as a circular saw, lathe, drill press, disk sander, and the like, said device having a base; a horizontally extending support frame carried by said base; a drive motor mounted on said support frame for being adjustably moved to and maintained at selected positions along said horizontally extending support frame, said drive motor having a rotatable drive shaft extending generally horizontally; and an accessory seat carried by said base for receiving thereon various woodworking tools or accessories; the combination therewith of a carving adapter for converting the multi-purpose woodworking machine into a carving spindle for making individual and detailed carvings in wooden objects and the like; said carving adapter comprising:

a generally rectangular mounting platform oriented horizontally and carried by said accessory seat;

a pair of bearings carried at opposite ends of said mounting platform and positioned coaxially with one another;

an elongate rotatable shaft positioned coaxially with the rotatable drive shaft of the drive motor and having a first portion of generally cylindrical shape extending from one end thereof to a medial location in said shaft and a second portion of generally tapered configuration extending from said medial location to the other end thereof, said first portion of the elongate shaft being rotatably received by said bearings, and said second portion of said shaft projecting outwardly beyond said mounting platform and beyond the base of the multi-purpose woodworking machine so as to provide a wide clearance for manipulating the wooden objects during carving thereof;

said first and second portions of said shaft being of substantially similar lengths for providing balanced operation of said shaft;

a flexible coupling interconnecting said one end of said elongate shaft with the drive shaft of the motor for thereby rotating the shaft under operation of the motor;

said other end of said elongate shaft having a male threaded portion and a corresponding nut; and a cutting tool carried on said other end of said shaft by said male threaded portion and secured thereon by said nut so that upon operation of the motor the cutting tool is rotated for carving wooden objects which are brought into engagement with the carving tool.

10. A carving adapter, for making individual and detailed carvings especially wooden objects and the like, and for being used in combination with a multi-purpose woodworking machine of the type adapted for being converted into various woodworking devices such as a circular saw, lathe, drill press, disk sander, and the like, said device having a base; a horizontally extending support frame carried by said base; a drive motor mounted on said support frame for being adjustably moved to and maintained at selected positions along said horizontally extending support frame, said drive motor having a rotatable drive shaft extending generally horizontally; and an accessory seat carried by said base for receiving thereon various woodworking tools or accessories; said carving adapter comprising a mounting platform for being carried by the accessory seat;

bearing means carried by said mounting platform;

an elongate rotatable shaft having a first portion extending from one end thereof to a medial location in said shaft and a second portion extending from said medial location to the other end thereof, said first portion of the elongate shaft being rotatably received by said bearing means, and said second portion of the shaft projecting outwardly beyond said mounting platform and beyond the base of the multi-purpose woodworking machine so as to provide a wide clearance for manipulating the wooden objects during carving thereof;

means for interconnecting said one end of said rotatable elongate shaft with the drive shaft of the motor for thereby rotating the shaft upon operation of the motor; and mounting means provided at said other end portion of said rotatable shaft for receiving thereon a cutting tool so that upon operation of the motor the cutting tool is rotated for carving wooden objects which are brought into engagement with the carving tool.

11. A carving adapter according to claim 8 wherein said second portion of the rotatable shaft is tapered from said medial location to said mounting means to reduce interference and obstruction during carving of the wooden object.

* * * * *